United States Patent
Jacobson et al.

(10) Patent No.: US 11,349,292 B2
(45) Date of Patent: May 31, 2022

(54) ARC FLASH PROTECTION OF POWER SYSTEMS

(71) Applicant: Raytheon Company, Waltham, MA (US)

(72) Inventors: Boris S. Jacobson, Westford, MA (US); David H. Altman, Marlborough, MA (US)

(73) Assignee: RAYTHEON COMPANY, Waltham, MA (US)

( * ) Notice: Subject to any disclaimer, the term of this patent is extended or adjusted under 35 U.S.C. 154(b) by 328 days.

(21) Appl. No.: 16/378,964

(22) Filed: Apr. 9, 2019

(65) Prior Publication Data

US 2020/0328585 A1 Oct. 15, 2020

(51) Int. Cl.
*H02H 7/20* (2006.01)
*H02H 1/00* (2006.01)
(Continued)

(52) U.S. Cl.
CPC ............ *H02H 1/0015* (2013.01); *H02H 3/20* (2013.01); *H02H 7/20* (2013.01); *H02J 3/24* (2013.01); *H02J 3/381* (2013.01)

(58) Field of Classification Search
CPC .... H02J 9/062; H02J 9/061; H02J 3/24; H02J 3/381; H02M 3/158; H02M 3/33507; H02M 3/33546; H02M 2001/0025; H02M 1/32; H01H 47/22; H01H 47/32; H01H 47/325; H05B 47/11; H02H 1/0015; H02H 3/20; H02H 7/28; H02H 7/26; H02H 7/10; H02H 7/20
See application file for complete search history.

(56) References Cited

U.S. PATENT DOCUMENTS 4,974,140 A 11/1990 Iba et al.
6,122,572 A 9/2000 Yavnai
(Continued)

FOREIGN PATENT DOCUMENTS

CN 1954280 A 4/2007
EP 3108555 A1 12/2016
(Continued)

OTHER PUBLICATIONS

International Search Report and Written Opinion issued in International Application No. PCT/US2020/026999; Application Filing Date Apr. 7, 2020; dated Jun. 26, 2020 (14 pages).
(Continued)

*Primary Examiner* — Bryan R Perez
(74) *Attorney, Agent, or Firm* — Cantor Colburn LLP

(57) ABSTRACT

A computer-implemented method includes measuring, by a first local controller connected to a first converter, one or more characteristics of the first converter. The first converter belongs to a set of two or more converters in a power system configured to power equipment, and each of the two or more converters is connected to a respective local controller. An arc fault is detected based at least in part on the one or more characteristics of the first converter, and an indication of the arc fault is communicated to the central controller. The arc fault is remediated by performing one or more remedial operations determined by at least one of the first local controller and the central controller.

18 Claims, 9 Drawing Sheets

(51) Int. Cl.
*H02H 3/20* (2006.01)
*H02J 3/24* (2006.01)
*H02J 3/38* (2006.01)

(56) References Cited

U.S. PATENT DOCUMENTS

| | | | |
|---|---|---|---|
| 7,145,072 B1 | 12/2006 | Hirschmann, Jr. et al. | |
| 7,508,224 B2 | 3/2009 | Williams | |
| 7,580,819 B2 | 8/2009 | De et al. | |
| 7,966,101 B2 | 6/2011 | Mitani et al. | |
| 7,982,442 B2 | 7/2011 | Solyom et al. | |
| 8,046,320 B2 | 10/2011 | De | |
| 8,319,136 B2 | 11/2012 | Byron et al. | |
| 8,441,151 B2 | 5/2013 | Huang | |
| 9,471,731 B2 | 10/2016 | Fu et al. | |
| 9,590,524 B1* | 3/2017 | Jacobson | H02M 1/32 |
| 2005/0197991 A1 | 9/2005 | Wray et al. | |
| 2006/0274460 A1* | 12/2006 | Zuercher | H02H 1/0015 |
| | | | 361/42 |
| 2011/0019444 A1 | 1/2011 | Dargatz et al. | |
| 2013/0076332 A1 | 3/2013 | Burgos et al. | |
| 2013/0099800 A1 | 4/2013 | Francis et al. | |
| 2014/0032148 A1 | 1/2014 | Verhulst et al. | |
| 2015/0019175 A1 | 1/2015 | Karimi et al. | |
| 2015/0244160 A1 | 8/2015 | Schweitzer, III et al. | |
| 2015/0311815 A1* | 10/2015 | Nedic | H02M 7/003 |
| | | | 363/21.01 |
| 2016/0126843 A1 | 5/2016 | Kelly | |
| 2016/0149404 A1 | 5/2016 | Karimi et al. | |
| 2016/0274947 A1 | 9/2016 | Miyamori et al. | |
| 2016/0276821 A1 | 9/2016 | Politis et al. | |
| 2017/0070043 A1 | 3/2017 | Smith et al. | |
| 2017/0155272 A1 | 6/2017 | Kim et al. | |
| 2019/0044340 A1 | 2/2019 | Jacobson et al. | |
| 2019/0229609 A1 | 7/2019 | Li et al. | |
| 2020/0110115 A1 | 4/2020 | Baone et al. | |

FOREIGN PATENT DOCUMENTS

| | | | |
|---|---|---|---|
| WO | 2011044624 A1 | 4/2011 | |
| WO | 2013078234 A1 | 5/2013 | |
| WO | 2015127093 A1 | 8/2015 | |

OTHER PUBLICATIONS

Balog et al., "The Load as an Energy Asset in a Distrubuted DC SmartGrid Architecture," IEEE Transactions on SMart Grid, vol. 3, No. 1, Mar. 2012, pp. 253-260.

Dragicevic et al., "Supervisory Control of an Adaptive-Droop Regulated DC Microgrid with Battery Management Capability," IEEE Transactions on Power Electronics, vol. 29, No. 2, Feb. 2014, pp. 695-706.

Gab-Su Seo, et al, "Photovoltaic Module-Level DC-DC Converter with Arc Fault Protection Scheme for DC Distribution System", 2013, IEEE. pp. 917-923.

H. Bruce Land and Tammy Gammon, "Addressing Arc-Flash Problems in Low-Voltage Switchboards: A Case Study in Arc Fault Protection", IEEE Transactions On Industry Applications, vol. 51, No. 2, Mar./Apr. 2015, pp. 1897-1908.

H. Bruce Land, et al, "Design of a Sensor to Predict Arcing Faults in Nuclear Switchgear", IEEE Transactions On Nuclear Science, vol. 50, No. 4, Aug. 2003, pp. 1161-1165.

H. Bruce Land, III, Sensing Switchboard Arc Faults, IEEE Power Engineering Review, Apr. 2002, pp. 18-27.

H.B. Land III, "Determination of the cause of arcing faults in low voltage switchboards", IEEE Transactions on Industry Applications, vol. 44, No. 2, Mar./Apr. 2008.

H.B. Land III, "Determination of the Cause of Arcing Faults in Low-Voltage Switchboards", IEEE Transactions on Industry Applications, vol. 44, No. 2, Mar./Apr. 2008., pp. 430-436.

Magne et al., "Active Stabilization of DC Microgrids Without Remote Sensors for More Electric Aircraft," IEEE Transactions on Industry Applications, vol. 49, No. 5, Sep. 2013, pp. 2352-2360.

Miao et al., "Automated Digital Controller Design for Switching Converters," IEEE 36th Power Electronics Specialists Conference, Jun. 2005, pp. 2729-2735.

Miao et al., "Detection of Instability and Adaptive Compensation of Digitally Controlled Switched-Mode Power Supplies," IEEE Applied Power Electronics Conference and Exposition, vol. 1, Mar. 2005, pp. 63-69.

Miao et al., "System Identification of Power Converters with Digital Control Through Cross-Correlation Methods," IEEE Transactions on Power Electronics, vol. 20, No. 5, Sep. 2005, pp. 1093-1099.

Morroni et al., "Adaptive Tuning of Switched-Mode Power Supplies Operating in Discontinuous and Continuous Conduction Modes," IEEE Transactions on Power Electronics, vol. 24, No. 11, Nov. 2009, pp. 2603-2611.

Morroni et al., "An Online Stability Margin Monitor for Digitally Controlled Switched-Mode Power Supplies," IEEE Transactions on Power Electronics, vol. 24, No. 11, Nov. 2009, pp. 2639-2648.

Morroni et al., "Design and Implementation of an Adaptive Tuning System Based on Desired Phase Margin for Digitally Controlled DC-DC Converters," IEEE Transactions on Power Electronics, vol. 24, No. 2, Feb. 2009, pp. 559-564.

Morroni et al., "Robust Adaptive Tuning of Digitally Controlled Switched-Mode Power Supplies," IEEE Applied Power Electronics Conference and Exposition, Feb. 2009, pp. 240-246.

Seltzer et al., "Gain-Scheduled Control of Multi Angle Phase Shift Modulated Dual Active Bridge Series Resonant DC/ DC Converters," IEEE 13th Workshop on Control and Modeling for Power Electronics, Jun. 2012, pp. 1-7.

Seltzer et al., "Multi-Mode Control of Series and Parallel Converters for Bidirectional Power Systems," IEEE 15th Workshop on Control and Modeling for Power Electronics, Jun. 2014, pp. 1-8.

Shirazi et al., "An Autotuning Digital Controller for DC-DC Power Converters Based on Online Frequency-Response Measurement," IEEE Transactions on Power Electronics, vol. 24, No. 11, Nov. 2009, pp. 2578-2588.

Shirazi et al., "Integration of Frequency Response Measurement Capabilities in Digital Controllers for DC-DC Converters," IEEE Transactions on Power Electronics, vol. 23, No. 5, Sep. 2008, pp. 2524-2535.

Thandi et al., "Modeling, Control and Stability Analysis of a PEBB based DC DPS," IEEE Transaction on Power Delivery, vol. 14, No. 2, Apr. 1999, pp. 497-505.

R. Wilkins, M. Allison and M. Lang "Improved Method for Arc Flash Hazard Analysis", IEEE, May 2004, pp. 55-62.

* cited by examiner

ARC FLASH PROTECTION OF POWER SYSTEMS

BACKGROUND

The present invention relates to arc faults and, more specifically, to arc flash protection of power systems.

An electric arc is a luminous bridge formed in an air gap between two electrodes. An arc flash occurs when electric current flows through this air gap between conductors. Specifically, an arc flash is the light and heat produced by an arc fault, a type of electrical explosion or discharge resulting from movement of electric discharge through the air from one voltage phase to another, or to ground. The arc fault leads to an arc flash, a rapid rise in temperature and pressure between the conductors, which can lead to fires, pressure waves, or flying shrapnel.

Currently, arc faults are reduced or mitigated in various ways. For instance, an organization with equipment in danger of arc faults can perform a hazard analysis on that equipment to calculate how much energy an arc flash could release along various points in the power chain. Personnel can then be made aware of the arc flash potential, can be required to wear protective equipment, and can be trained on how to react to arc flashes. Additionally, the amount of available arc fault current can be reduced, such as by opening a tie between dual power feeds during maintenance, which can cut available arc fault current in half. For another example, high-resistance grounding (HRG) can be employed to provide a path for ground current via a resistance that limits current magnitude.

SUMMARY

Embodiments of the present invention are directed to a computer-implemented method for remediating an arc fault. A non-limiting example of the computer-implemented method includes measuring, by a first local controller connected to a first converter, one or more characteristics of the first converter. The first converter belongs to a set of two or more converters in a power system configured to power equipment, and each of the two or more converters is connected to a respective local controller. An arc fault is detected based at least in part on the one or more characteristics of the first converter, and an indication of the arc fault is communicated to the central controller. The arc fault is remediated by performing one or more remedial operations determined by at least one of the first local controller and the central controller.

Embodiments of the present invention are directed to a system for remediating an arc fault. A non-limiting example of the system includes two or more local controllers and a central controller. The two or more local controllers are connected to a power system configured to power equipment, where the power system includes one or more generators and one or more converters. Each local controller of the two or more local controllers is connected a respective converter of the power system, a respective generator of the power system, or a respective energy storage unit. The central controller is in communication with each local controller of the two or more local controllers. A first local controller of the two or more local controllers includes at least a data collection agent configured to measure one or more characteristics of a first converter connected to the first local controller; an analysis agent configured to identify an arc fault based at least in part on the one or more characteristics of the first converter; and a decision-making agent configured to determine a remedial operation responsive to the arc fault.

Embodiments of the invention are directed to a computer-program product for remediating an arc fault, the computer-program product including a computer-readable storage medium having program instructions embodied therewith. The program instructions are executable by a processor to cause the processor to perform a method. A non-limiting example of the method includes measuring, by a first local controller connected to a first converter, one or more characteristics of the first converter. The first converter belongs to a set of two or more converters in a power system configured to power equipment, and each of the two or more converters is connected to a respective local controller. Further according to the method, an arc fault is detected based at least in part on the one or more characteristics of the first converter, and an indication of the arc fault is communicated to the central controller. The arc fault is remediated by performing one or more remedial operations determined by at least one of the first local controller and the central controller.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
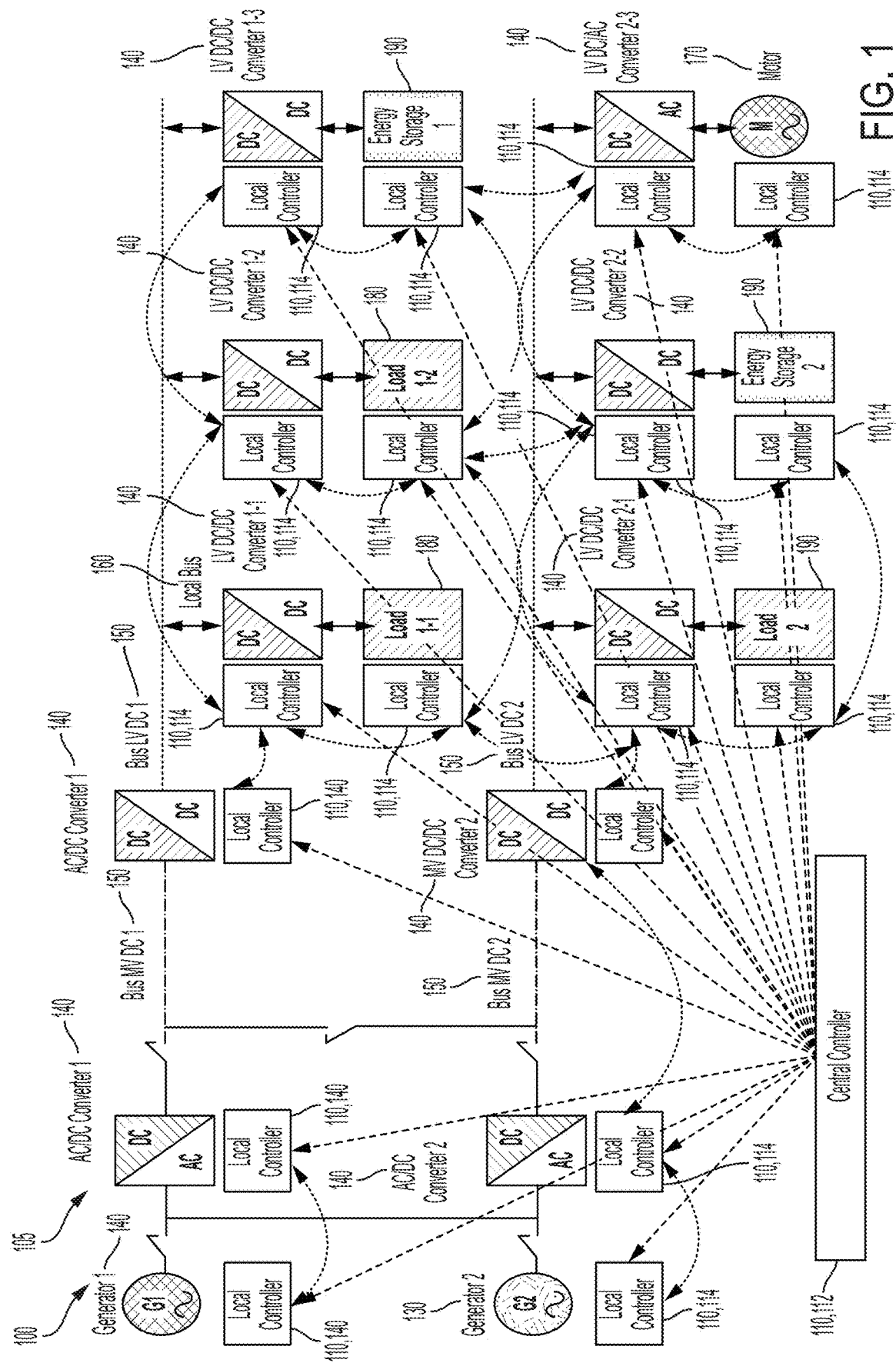
FIG. 1 is a block diagram of a protection system for protecting an environment from the effects of arc faults, according to some embodiments of this disclosure.

The diagrams depicted herein are illustrative. There can be many variations to the diagrams or the operations described therein without departing from the spirit of the invention. For instance, the actions may be performed in a differing order or actions may be added, deleted or modified.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising," "includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

For the sake of brevity, conventional techniques related to making and using aspects of the invention may or may not be described in detail herein. In particular, various aspects of computing systems to implement the various technical features described herein may be well known. Accordingly, in the interest of brevity, some conventional implementation details are only mentioned briefly herein or are omitted entirely without providing the well-known system or process details.

Turning now to an overview of technologies that are more specifically relevant to aspects of the invention, as discussed above, various mechanisms can be used to reduce the current available to an arc flash. However, these mechanisms have drawbacks. For instance, opening a tie between dual power feeds during maintenance can reduce redundancy in the power scheme, which can expose equipment to an increased failure risk. Although HRG can also reduce the available current, this technique is prohibited in the United States on distribution systems with service loads that are connected line-to-neutral. In short, no adequate solutions exist at present. Current devices and methods are limited to protection of individual components, and the dominant approach is simply to cut power to the affected area.

One or more embodiments of the invention address the above-described shortcomings of the prior art by providing a smart mechanism to recognize and address arc faults as described herein.

FIG. 1 is a block diagram of a protection system 100, for protecting the surrounding environment from the effect of arc faults, according to some embodiments. As shown in FIG. 1, the protection system 100 may be integrated with, or in communication with, a power system 105 used to power one or more pieces of equipment, and the protection system 100 may recognize and mitigate arc faults in the power system 105. The equipment supported by the power system 105 may vary between embodiments but may include, for example, a ship, a submarine, or a manufacturing device. In some embodiments, the power system 105 may be initially provided without the protection system 100, and the protection system 100 may be added modify and add protection to the power system 105.

As shown in FIG. 1, the protection system 100 may include one or more controllers 110, including a central controller 112 as well as one or more local controllers 114 in communication with the central controller 112. Generally, the central controller 112 may control activities of the local controllers 114 to interact with the power system 105 as needed, and as described herein. The local controllers 114 may make local decisions regarding components of the power system 105 to which the local controllers 114 are directly or indirectly connected, as well be described further below. In some embodiments, the decisions of one or more controllers 110 may be aggregated, for instance, into a majority decision, to determine a final decision regarding how to remediate an arc fault.

As shown in FIG. 1, the power system 105 may include one or more generators 130 and one or more converters 140, which may include alternating current (AC) to direct current (DC) (AC/DC) converters or DC/DC converters, or a combination of both. As shown in the example of FIG. 1, each generator 130 may behave as a prime power source and may be connected to a respective converter 140. Specifically, in the example shown Generator 1 may be connected to AC/DC Converter 1, and Generator 2 may be connected to AC/DC Converter 2. In this example, a common bus 150 connects each such AC/DC converter 140 to a respective first-level DC/DC converter 140, specifically medium-voltage (MV) DC/DC Converter 1 and MV DC/DC Converter 2 for AC/DC Converter 1 and AC/DC Converter 2 respectively. Another respective common bus 150 further connects each first-level DC/DC converter to a set of additional second-level DC/DC converters 140, each of which is connected to the common bus 150 by way of a respective local bus 160. In this example, such second-level DC/DC converters 140 connected to DC/DC Converter 1 by way of a shared common bus 150 include low-voltage (LV) DC/DC Converter 1-1, LV DC/DC Converter 1-2, and LV DC/DC Converter 1-3, and the second-level DC/DC converters 140 connected to DC/DC Converter 2 by way of a shared common bus are LV DC/DC Converter 2-1, LV DC/DC Converter 2-2, and LV DC/AC Converter 2-3, which is connected to a motor 170 for powering that motor 170. In some embodiments, the power system 105 supports bidirectional power flow to facilitate energy transfer as described herein.

As mentioned above, the protection system 100 may include a central controller 112 and a set of local controllers 114, including a respective local controller 114 in communication with each generator 130, converter 140, and motor 170 in the power system 105. Additionally, as shown in this example, the protection system 100 may include one or more loads 180, to consume electric lower, and one or more energy storage units 190, each of which may be capable of absorbing or releasing energy as described herein. In some embodiments of the invention, however, additionally or alternatively to each energy storage unit 190, the protection system 100 may include a set of resistors, inductors, or capacitors.

As will be described further below, in some embodiments, the central controller 112 and local controllers 114 cooperate to detect and manage arc faults. As described further below, various operations may be initiated by the central controller 112 or the local controllers 114, such as, for example, initiating a foldback mode in the voltage-ampere curve of a generator 130 or converter 140 to reduce the power available to the arc fault, or smoothing a profile of bus current during a pulsed arc fault by drawing power from the bus and depositing that power in an energy storage unit 190. Together, the central controller 112 and the local controllers 114 may form a hierarchy of intelligence, with the central controller 112 residing at the highest level and with the local controllers 114 residing at a lower level. Further, in some embodiments, one or more additional levels may exist lower than the local controllers 114, where such additional levels may be used for internal protection of converters 140 but need not be used for protection from arc faults as described herein.

Figure 2A:
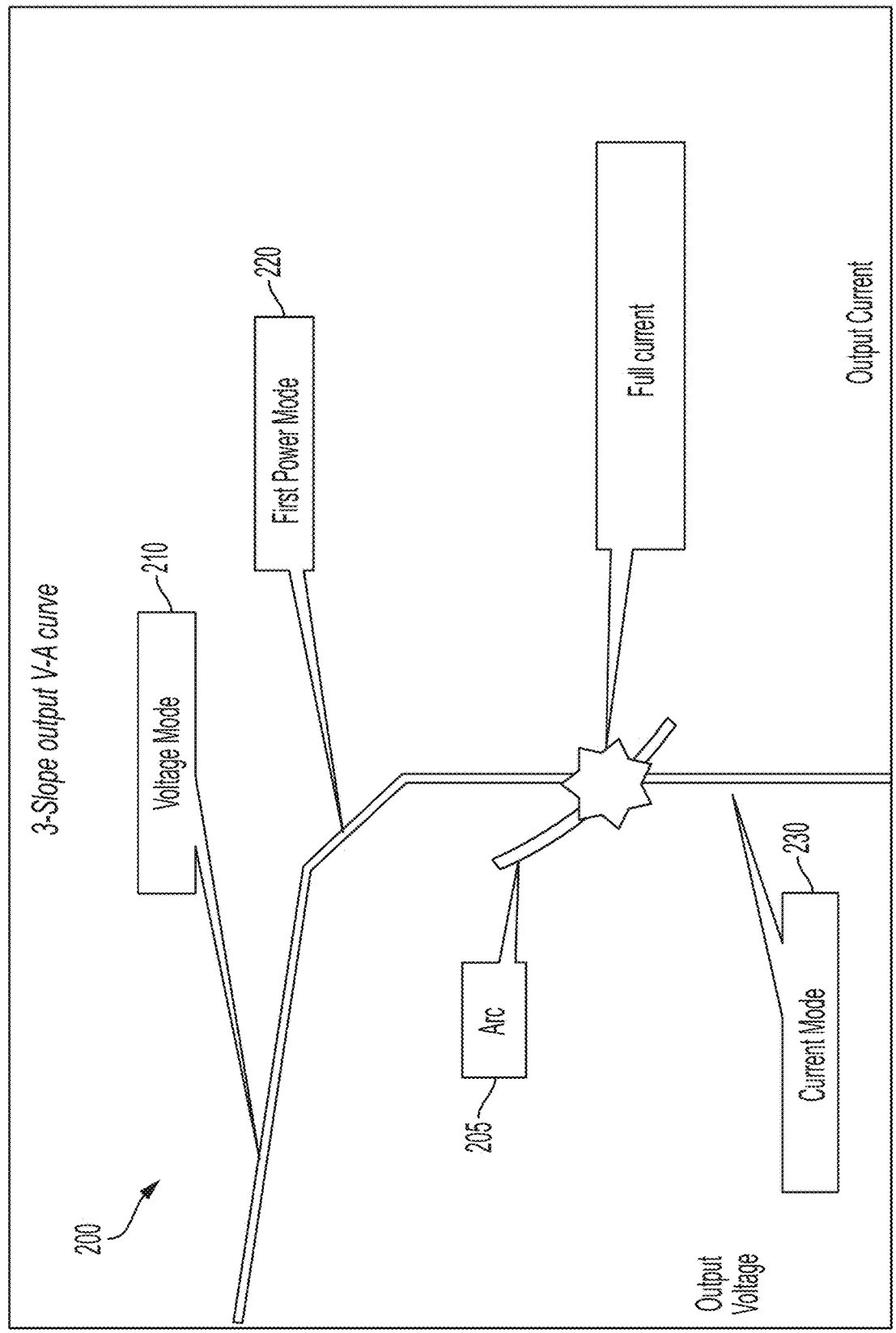
FIG. 2A illustrates an example V-A curve of a power system to be protected by the power system.

FIG. 2A illustrates an example V-A curve 200 of a power system 105. A V-A curve describes the relationship of static output characteristics of a power source, where voltage is plotted on the vertical axis and amperage is plotted on the horizontal axis. As shown in FIG. 2A, the V-A curve 200 includes various modes, specifically a voltage mode 210, a first power mode 220, and a current mode 230. When the power system 105 is in voltage mode 210, the voltage output of a power source is constant, whereas in current mode 230, the current is constant, and in power mode 220, the power is constant. While this three-slope V-A curve 200 ensures current and power sharing, the V-A curve 200 of FIG. 2A presents problems. For instance, this V-A curve 200 sustains arc faults of arcs 205 at nearly full output power. This is a significant problem especially in the case of medium-voltage direct current (MVDC) and high-voltage direct current.

Figure 2B:
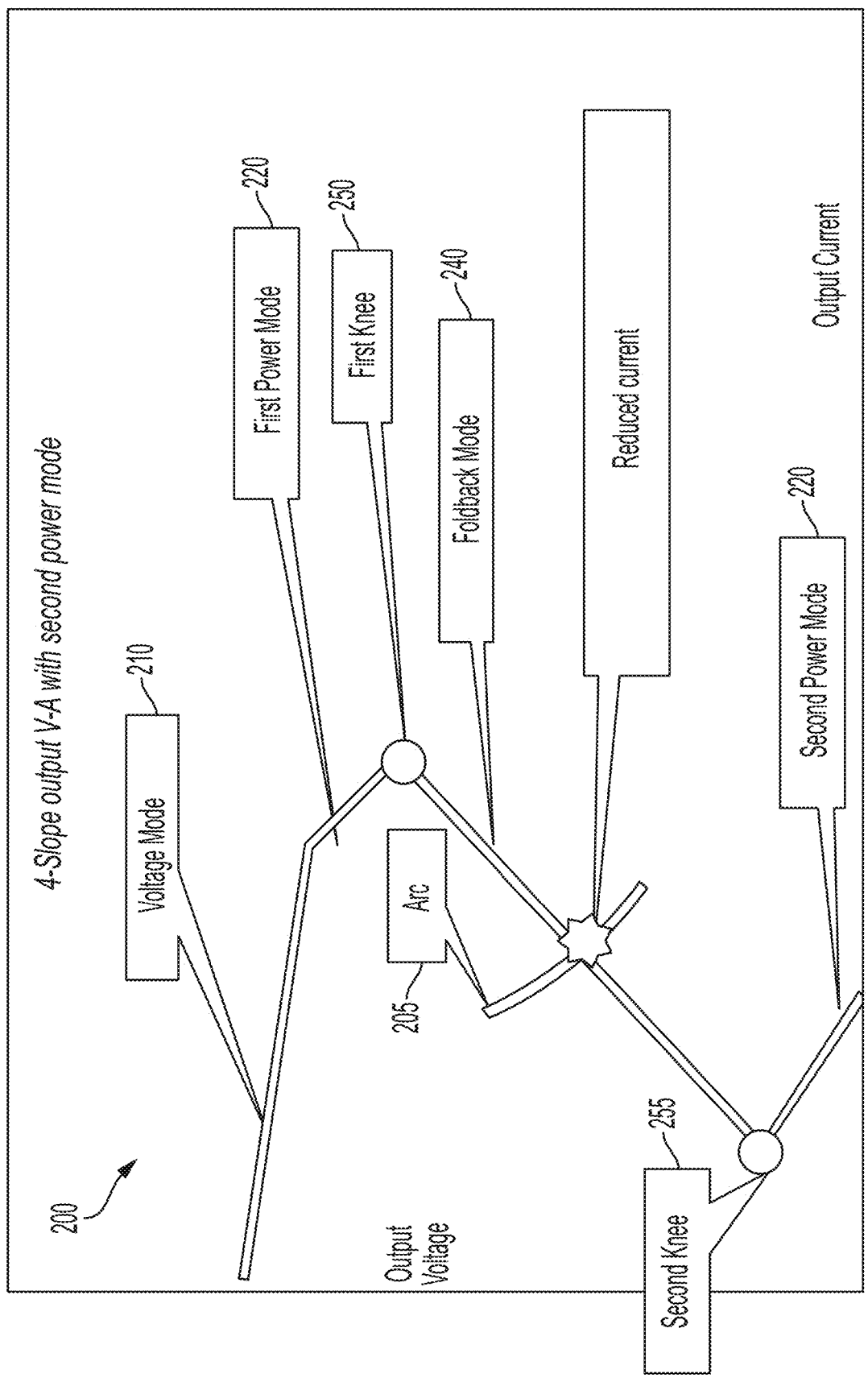
FIG. 2B illustrates a modified version of the V-A curve of FIG. 2A, where the modification incorporates a foldback mode, according to some embodiments.

FIG. 2B illustrates a modified version of the V-A curve 200 of FIG. 2A, where the modification is in accordance to some embodiments. As shown in FIG. 2B, the protection system 100 may incorporate a foldback mode 240 into the V-A curve of one or more generators 130 or power converters 140 of the power system 105. Each of the generators 130 and power converters 140 used in the power system 105 may feature a four-slope V-A curve 200, such as that in FIG. 2B, supporting a foldback mode 240. In this example, addition of the foldback mode 240 also includes the incorporation of a first knee 250, a second knee 255, and a second power mode 220, as shown in FIG. 2B. In some embodiments, each knee 220 is added to the V-A curve 200 to enable the V-A curve 200 to foldback into the foldback mode 240, which is neither a power mode 220 nor a voltage mode 210. In some embodiments, by shifting to the foldback mode 240 below the first knee 250, the protection system 100 cuts down the power available to an arc 205. Further, the second power mode 220 may provide current at low voltage and low power for an initial charge-up of a capacitive load. The resulting four-slope curve of the V-A curve 200 may thus combine lower fault current with the ability to start large capacitive or high energy storage loads.

Thus, to avoid service interruptions, the foldback mode 240 may include characteristics that allow repeating shutdown-and-restart cycles at reduced power. In some cases, the restart aspect of a shutdown-and-restart enables the power system 105 to continue running in the case of a false alarm of an arc flash, while the shutdown aspect cuts power to an arc 205.

Figure 3:
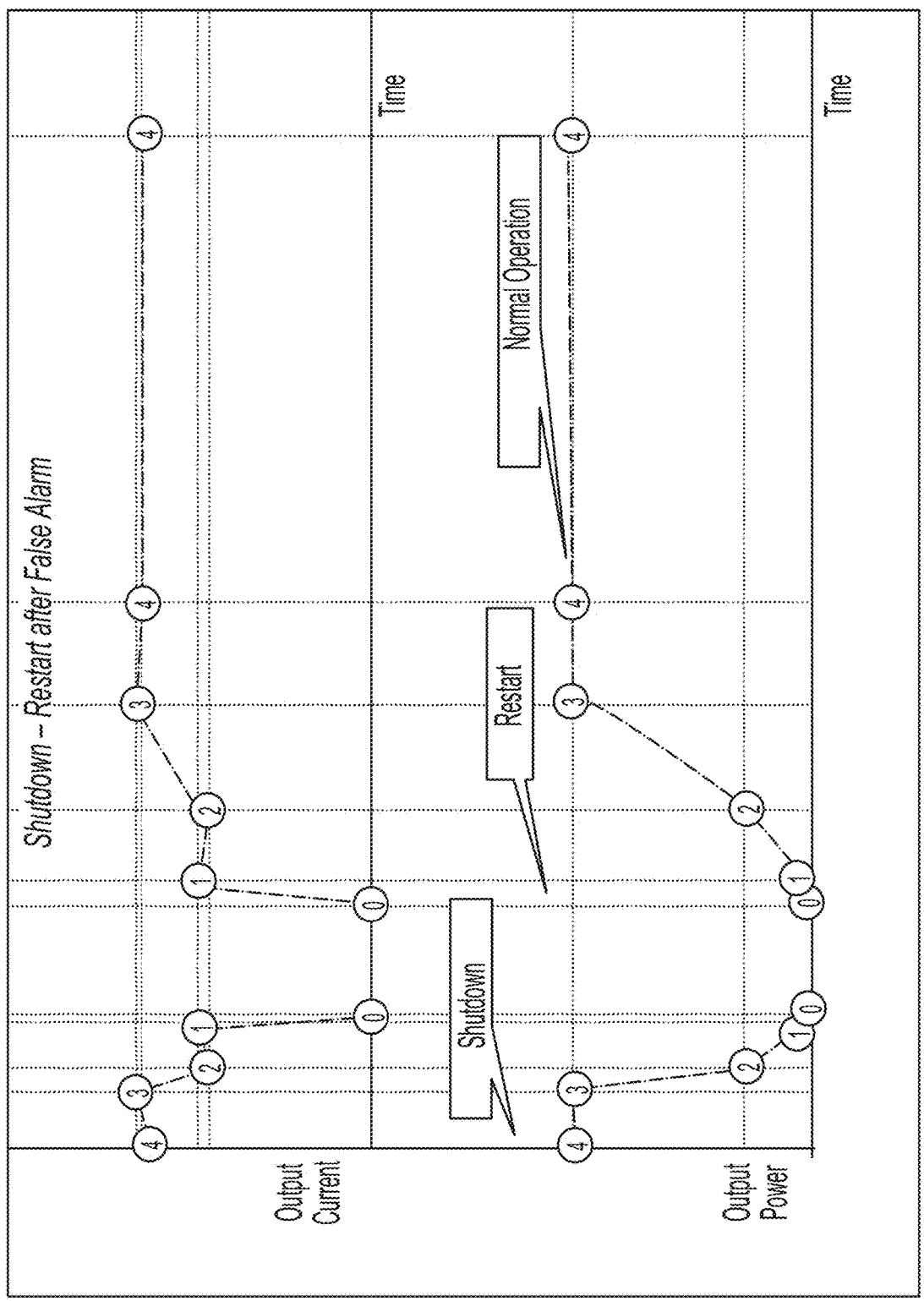
FIG. 3 shows two graphs illustrating an effect of incorporating the foldback mode into the V-A curve with a shutdown and a restart of the power system responsive to a false alarm, according to some embodiments.

FIG. 3 shows two graphs illustrating effects of incorporating the foldback mode 240 into the V-A curve 200 with a shutdown and a restart of a components of the power system 105, such as a generator 130 or converter 140, responsive to detection of an arc fault that turns out to be a false alarm (e.g., the arc 205 extinguishes itself), according to some embodiments. Specifically, FIG. 3 shows a first graph of output current versus time and a second graph of output power versus time. As shown in FIG. 3, upon detecting what appears to be arc fault, the protection system 100 may shut down a component (e.g., a generator 130 or a converter 140) of the power system 105. Upon restart, however, the component may resume normal operations with respect to both current and power. When no further detection of an arc fault occurs, then the component of the power system 105 may remain up.

Figure 4:
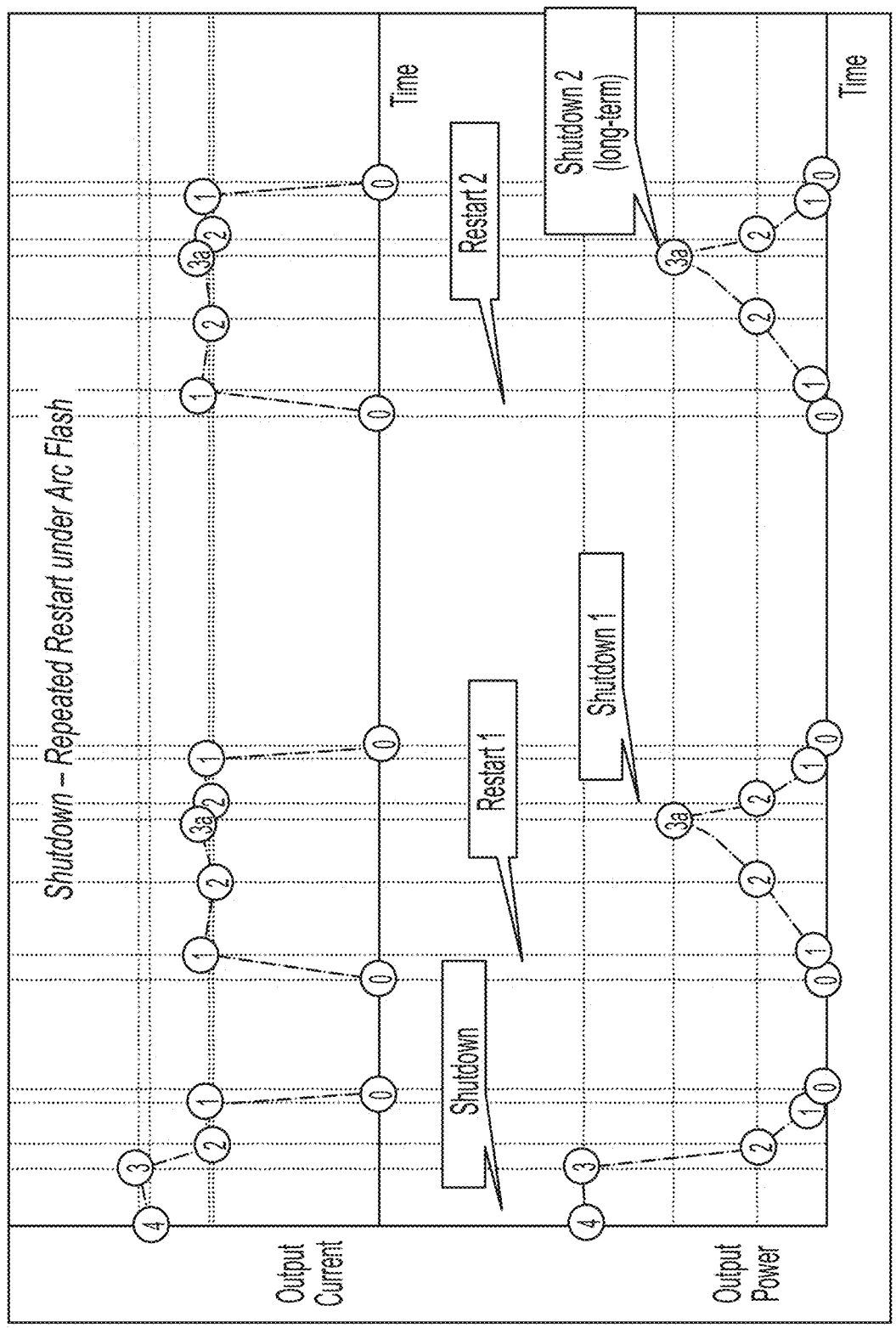
FIG. 4 shows two graphs illustrating an effect of incorporating the foldback mode into the V-A curve with repeated shutdowns and restarts of the power system responsive to an arc fault, according to some embodiments.

FIG. 4 shows two graphs illustrating effects of incorporating the foldback mode 240 into the V-A curve 200 of a component (e.g., a generator 130 or converter 140) of the power system 105 with repeated shutdowns and restarts of that component responsive to an arc fault, according to some embodiments. Specifically, FIG. 3 shows a first graph of output current versus time and a second graph of output power versus time. As shown in FIG. 4, in foldback mode 240, the component of the power system 105 can be repeatedly shut down and restarted responsive to repeated detection of the arc fault after each restart. Intervals between shutdowns and restarts and the number of shutdown-restart cycles may vary and may be adjusted as desired.

In some cases, an arc 205 may repeatedly self-extinguish and reignite, creating a large pulsating current. Thus, in some embodiments, the protection system 100 may monitor the arc current, IARC, and may draw (e.g., from an energy storage unit 190) a complementary current, ICOMP, to reduce the pulsed component of the bus current IBUS of the applicable local bus 160 or common bus 150. One or more energy storage units 190 may draw the complementary current, ICOMP, to reduce the pulsed component of the bus current, IBUS, thereby leveling out the bus current. However, because the duration, TARC, of the arc pulse may be unpredictable, the protection system 100 may estimate the amplitude, shape, and length of the complementary current pulse, TCOMP, needed.

Various mechanisms may be used for this estimation of characteristics of the complementary current pulse. For example, and not by way of limitation, one or more of the following estimation mechanisms may be used: make TCOMP dependent on or equal to TARC, by continuing the complementary pulse until the arc pulse ends, unless or until the arc 205 reignites; monitor the varying bus current of the applicable bus connected to the arc 205 and adjust ICOMP to track the running average value of the bus current; match the energy delivered to the arc 205; or utilize the arc's behavioral modes. Herein the behavioral modes can include arc's V-A characteristics that may be attached to faults provide. These can be dynamic and include time to re-ignite and extinguish the arc. In some embodiments, the protection system 100 may provide complementary current by charging the one or more energy storage units 190. If the energy storage units 190 are full, however, one or more resistors may be activated to dissipate energy in the energy storage units 190, thereby enabling the energy storage units 190 to be charged in the provision of complementary current. If the complementary current cannot match the arc current IARC, then the protection system 100 may provide a fraction of the full current required to complement the arc current.

As described above, in some embodiments, the protection system 100 includes one or more controllers 110. Each controller 110 may include one or more sensors, each of which provides or contributes to a mechanism of detection utilized to detect arc faults. The sensors included in a controller 110 may include, for example, an ultraviolet light radiation detector, a thermal radiation detector, an ultrasound detector, an electromagnetic radiation detector, or one or more sensors whose output can be used to estimate the amplitude, shape, or time of a complementary current pulse designed to equalizing a bus current profile. For instance, a controller 110 may detect a series-type arc 205 by the presence of at least (1) a sudden voltage drop at a load 180, not accompanied by the load change and (2) the appearance of electromagnetic interference (EMI) with typical arc spectrum. A controller 110 may reduce power available to an arc 205 by applying foldback mode 240 to one or more generators 130 and converters 140 coupled to the arc fault, thereby shutting down and restarting the one or more generators and converters 140 for adjustable time intervals. In the event of a pulsating arc 205, a controller 110 may draw current from the common bus 150 into a local energy storage unit 190 or one or more resistors to equalize the prime power profile. Additionally or alternatively, a controller 110 may re-compensate a local controller's feedback loop for the duration of an arc fault by, for example, changing the gain or poles and zeros of an error amplifier in the feedback loop.

In some embodiments, to perform the above operations, each controller 110 performs one or more internal tasks, each of which may be executed by an agent of the controller 110. The tasks performed by each controller 110 may include the following: data collection, analysis, decision-making, communication, and control signaling.

Figure 5:
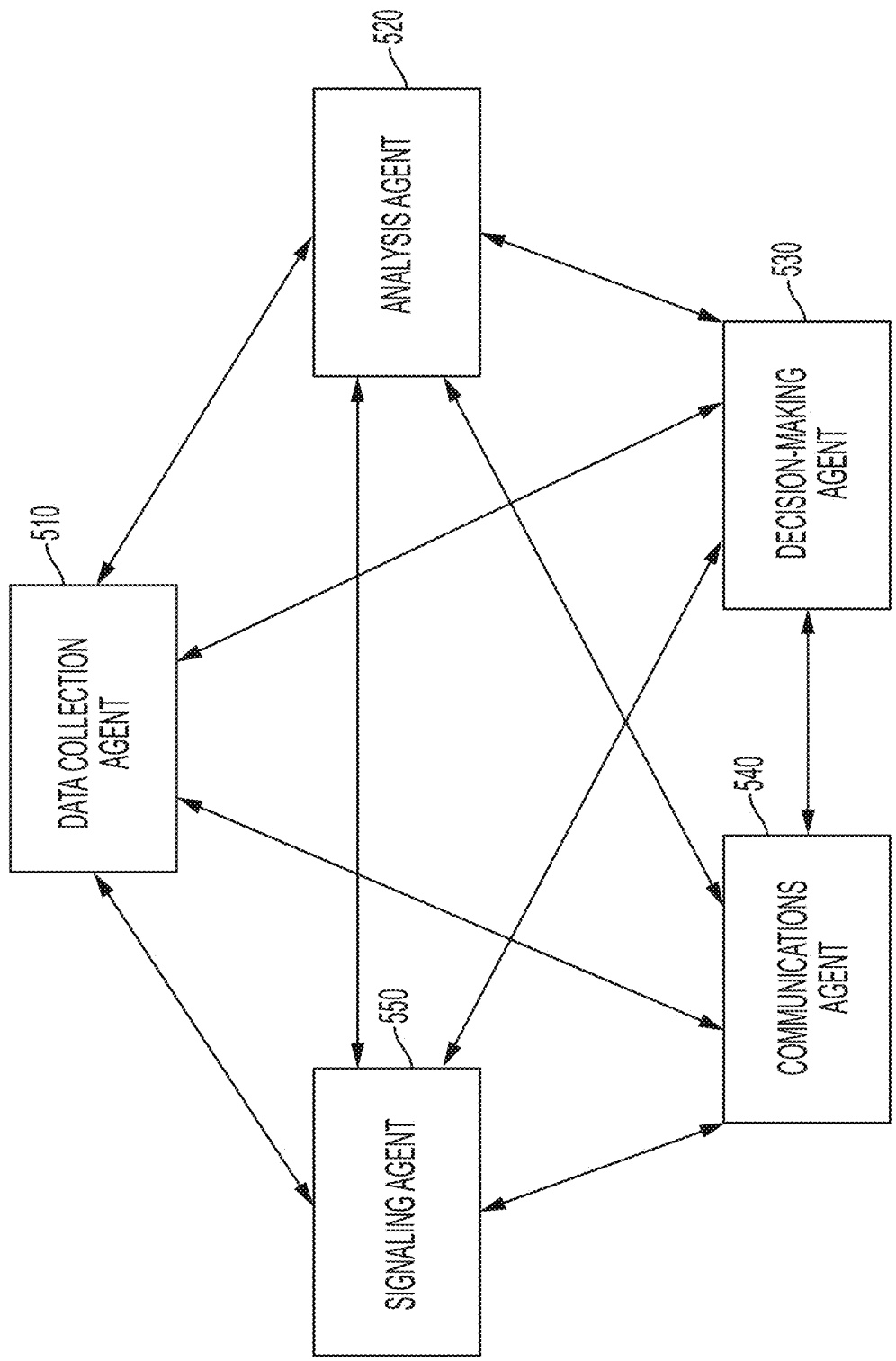
FIG. 5 is a block diagram of a controller utilized to control aspects of the protection system, according to some embodiments.

FIG. 5 is a block diagram of a controller 110, which may be the central controller 112 or a local controller 114, according to some embodiments. As shown in FIG. 5, in some embodiments, a controller 110 includes five agents, each of which may perform a respective one of the above internal tasks. More specifically, for instance, as shown in FIG. 5, the controller 110 may include a data collection agent 510, an analysis agent 520, a decision-making agent 530, a communications agent 540, and a signaling agent 550, which respectively correspond to the above tasks of the controller 110, specifically, data collection, analysis, decision-making, communication, and control signaling respectively. In some embodiments, however, an agent may be responsible for two or more of the above tasks and, therefore, may be a combination of the agents shown in FIG. 5. Each controller 110 may be a computing device or portion thereof, and each agent incorporated into a controller 110 may be, for example, a program running on the controller 110, a specialized hardware device, or a combination of both.

Generally, the central controller 112 may manage the protection system 100 at a high level. In some embodiments, the central controller 112 shuts down a prime power source (e.g., a generator 130) or a common bus 150, or both, as needed; sends requests to the local controllers 114 as needed to apply local crowbars or to equalize the prime power profile if an arc 205 is pulsating; coordinates operation of the local controllers 114; and reconciles conflicts among the local controllers 114 when two or more local controllers 114 disagree on how to handle an arc fault. The central controller 112 may be in communication with each local controller 114, and the local controllers 114 may be in communication with one another. The mechanism of communication between controllers 110 may take various forms, such as, for example, wired or wireless communication.

Although the local controllers 114 may take, and comply with, instructions from the central controller 112, each local controller 114 may be capable of acting autonomously by making its own decisions and acting upon such decisions. This autonomous nature can be useful for fast action or if communications with the central controller 112 are down. The local controllers 114 may protect specific areas (i.e., local areas) and may provide a fast first line of defense against an arc fault. In some embodiments, for instance, the local controllers 114 may be faster (e.g., having faster processors) than the central controller 112. Local controller 114 may perform the following tasks, for example: activating the foldback mode 240 described above; equalizing the prime power profile if an arc 205 is pulsating, by drawing current from a local bus 160 into a local energy storage unit 190; shunting a power source (e.g., a generator 130) to the fault area with a crowbar; and re-compensating the local controller's feedback loop for the duration of the arc 205.

In some embodiments, the data collection agent 510 of the controller 110 collects status information describing local components of the power system 105 (e.g., converters 140 or generators 130 that are connected to the controller 110). This collection of status information may include performing online (i.e., real-time) measurements of waveforms of the power system 105, such as, for example, load status input voltage; output voltage; input current at an interface to an MVDC system, if applicable; output current at the interface to the MVDC system, if applicable; and high-frequency EMI with spectrum typical for arc faults. These measurements can be indicative of an arc fault. For instance, a sudden voltage drop unaccompanied by a load change may indicate the presence of a series-type arc 205.

In some embodiments, the analysis agent 520 of the controller 110 analyzes the measurements taken by the respective data collection agent 510 of the controller 110 to determine whether the measurements indicate an arc fault. Various mechanisms exist to determine whether an arc fault exists based on such measurements, and thus, one of skill in the art will understand how to configure the analysis agent 520 to perform this task. In some embodiments, to reduce false alarms, the analysis agent 520 may use at least to types of measurements (e.g., load power and EMI) to detect an arc fault. The analysis agent 520 may further determine the location of the arc fault and the arc's conduction pattern (e.g., pulsing or continuous). The analysis agent 520 may perform self-diagnosis by determining whether the local controller's feedback loop re-compensation is adequate for the present operating conditions.

The decision-making agent 530 of the controller 110 receives an indication from the analysis agent as to whether an arc fault is occurring and, if so, the type of arc fault (e.g., series, parallel, ground) and whether the arc fault is pulsating. Based on this information, the decision-making agent 530 may decide how to address the arc fault, if one is deemed to exist. For instance, the decision-making agent 530 may decide to force local shutdown of a converter 140 or generator 130 to which the controller 110 is connected; to shunt a power source to the fault area with a fast crowbar; to apply foldback mode 240 to reduce power to the arc 205 and then restart; to draw current from the local bus 160 into an energy storage unit 190 to equalize the prime power profile, if the arc 205 is pulsating; or to re-compensate the local controller's feedback loop for the duration of the arc 205. If the decision-making agent 530 is on a local controller 114, the decision-making agent 530 may decide to shut down the local bus 160. If the decision-making agent 530 is the central controller 112, the decision-making agent 530 may decide to shut down the common bus 150, which may be implemented by sending to the central controller 112 a request to shut down the common bus 150.

In some embodiments, the communications agent 540 of the controller 110 facilitates communications with other controllers 110. To enable a reliable and fast connection, wired communications may be used; however, wireless communications are acceptable in some embodiments. The communications made by the communications agent 540 may include the following, for instance: a communication from a local controller 114 to the central controller 112 requesting shutdown of the common bus 150, a local bus 160, or a prime power source (e.g., a generator); or a communication from the central controller 112 to a local controller 114 granting or denying shutdown of the common bus 150, a local bus 160, or a prime power source (e.g., a generator). The communications agent 540 at the central controller 112 may receive one or more of the following communications, when applicable: an indication that a local crowbar has been applied to a fault area; an indication that foldback mode 240 has been applied and a local load has been restarted; or an indication that the pulsating power component of the prime power profile has been reduced In some embodiments, the signaling agent 550 of the controller 110 transmits signals (e.g., instructions) from the controller 110 to one or more components of the power system 105, so as to implement a remedial operation indicated by the decision-making agent 530. In other words, the signaling agent 550 may control such components of the power system 105 as needed. For instance, the signaling agent 550 may transmit a shutdown signal to a common bus 150, a local bus 160, or a generator 130, thereby shutting down the recipient component. The signaling agent 550 may draw power from a local bus 160 or common bus 150 to equalize the current power profile during a time interval specified by the decision-making agent 530.

Figure 6:
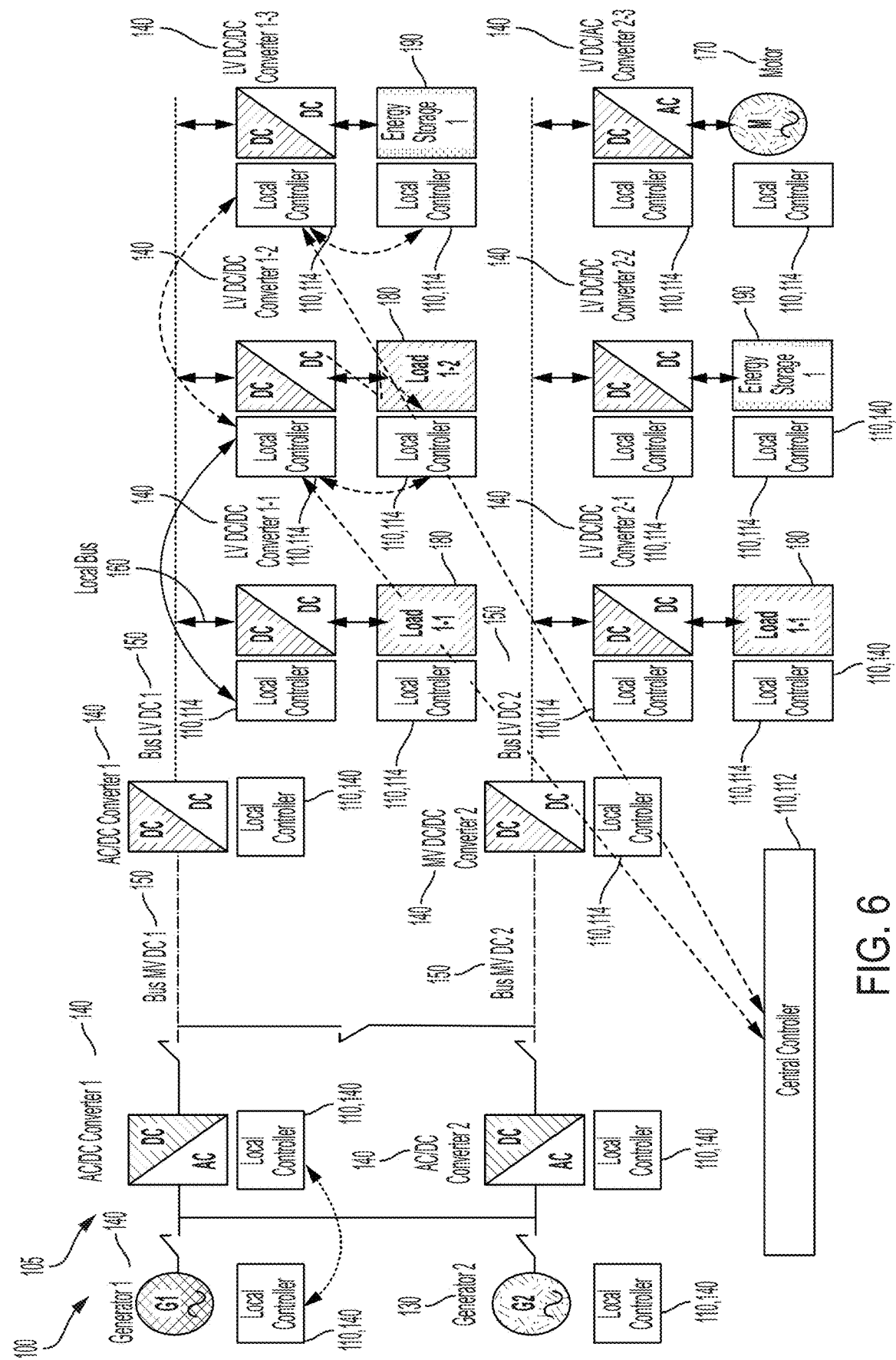
FIG. 6 illustrates the protection system's response to the event of a pulsating arc fault within the power system, according to some embodiments.

FIG. 6 illustrates the protection system's response to the event of a pulsating arc fault 610 within the power system 105, according to some embodiments. More specifically, as shown in FIG. 6, an arc fault 610 occurs at LV DC/DC Converter 1-2, which is a converter 140 in the power system 105 monitored by the protection system 100. In some embodiments, the protection system 100 handles this arc fault 610 as described in the below method.

Figure 7:
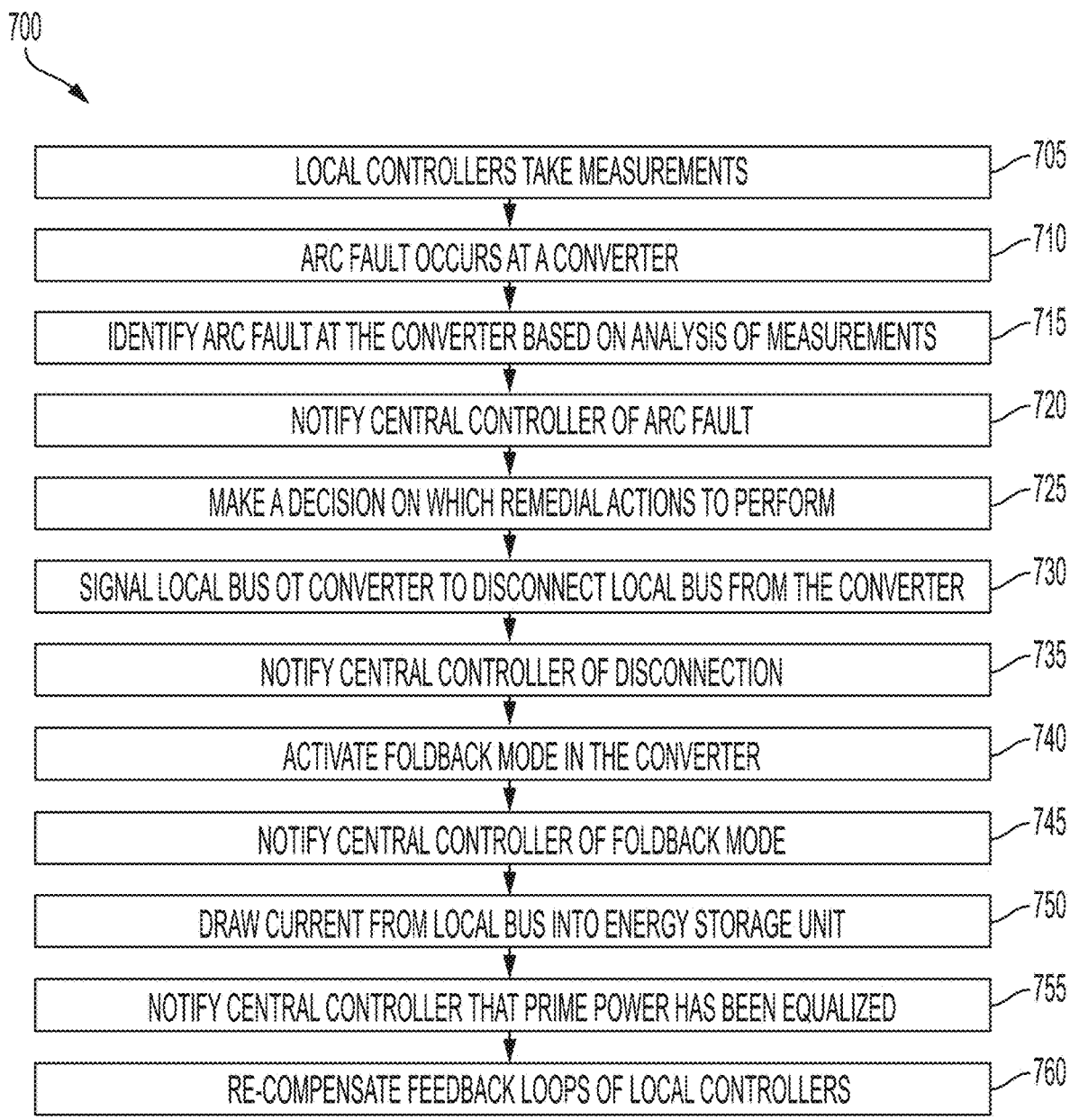
FIG. 7 is a flow diagram of a method of detecting and managing an arc fault, according to some embodiments.

FIG. 7 is a flow diagram of a method 700 of detecting and managing an arc fault 610, according to some embodiments. Specifically, FIG. 7 shows a method 700 of detecting and managing the arc fault 610 shown in the example of FIG. 6. It will be understood that other mechanisms of detecting and managing arc faults 610 are also within the capabilities of the protection system 100.

At block 705 of FIG. 7, each local controller 114 is taking measurements, through the respective data collection agents 510, and analyzing those measurements, through the respective analysis agents 520. It will be understood that the taking of measurements may be a continuous or periodic process while the protection system 100 is running. At block 710, an arc fault 610 occurs. Specifically, in this example, as shown in FIG. 6, the arc fault 610 occurs between LV DC/DC Converter 1-2 and Load 1-2.

Thus, at block 715, through the measurements taken by the respective data collection agents 510 and analyzed by the respective analysis agents 520 of one or more local controller 114, specifically Local Controller 1-2-1 and Local Controller 1-2-2, which are respectively connected to LV DC/DC Converter 1-2 and Load 1-2 in this example, the one or more local controllers 114 detect the arc fault 610. At block 720, the one or more local controllers 114 notify the central controller 112 of the arc fault 610.

Upon detecting the arc fault 610 at LV DC/DC Converter 1-2, at block 725, the local controller 114 of that converter 140 makes a decision on which remedial operations to perform. For instance, the decision-making agent 530 may make such decision based on analysis performed by the analysis agent 520. In some embodiments, the decision includes a selection of one or more remedial operations from a pre-established set of available remedial operations, such as those described in this disclosure. Further, in some embodiments, the decision-making agent 530 may apply a decision tree to current measurements and analysis to determine which of such remedial actions to take. In some embodiments, the local controller 114 may receive instructions from the central controller 112 as to which actions to take, and in that case, the local controller 114 may comply with those instructions in determining which remedial actions to perform. In this example, the local controller 114 decides to disconnect the converter 140 from the local bus 160, specifically Bus LV DC 1, to implement foldback mode 240 to draw current from the local bus 160 into an energy storage unit 190, and to re-compensate the feedback loop of each local controller 114 involved in these activities.

At block 730, to perform the disconnection, the signaling agent 550 of the local controller 114 signals the local bus 160 to disconnect the converter 1409 or signals the converter 140 to disconnect from the local bus 160. At block 735, the local controller 114 may notify the central controller 112 of the disconnection. At block 740, while the converter 140, LV DC/DC Converter 1-2, is disconnected from the local bus 160, the local controller 114 activates foldback mode 240 in the converter 140, thereby reducing the power available to the arc 205. At block 745, the local controller 114 may notify the central controller 112 of the activation of foldback mode. At block 750, the local controller 114 draws current from the local bus 160 into an energy storage unit 190, specifically Energy Storage 1. As shown in the example of FIG. 6, Local Controller 1-2 is not directly connected to Energy Storage 1, but rather, it is Local Controller 1-3-2 that is directly connected to Energy Storage 1. Thus, to draw current to Energy Storage 1, Local Controller 1-2-1 may communicate with Local Controller 1-3-1, which may communicate with Local Controller 1-3-2, which is connected to Energy Storage 1. Local Controller 1-3-1 may draw current from the local bus 160 and may pass that current through LV DC/DC Converter 1-3-1, which may pass the current to Energy Storage 1, which may be signaled by Local Controller 1-3-2 to receive the current. At block 755, the local controller 114 may notify the central controller 112 that the pulsating power component of the prime power profile has been reduced. Additionally, at block 760, for each local controller 114 involved in the above activities, the protection system 100 may then re-compensate the feedback loops.

As a result of the above operations performed responsive to the arc fault 610, the protection system prevents fault propagation and overall system shutdown, localizes equipment damage, and reduces impact on the generators 130.

Figure 8:
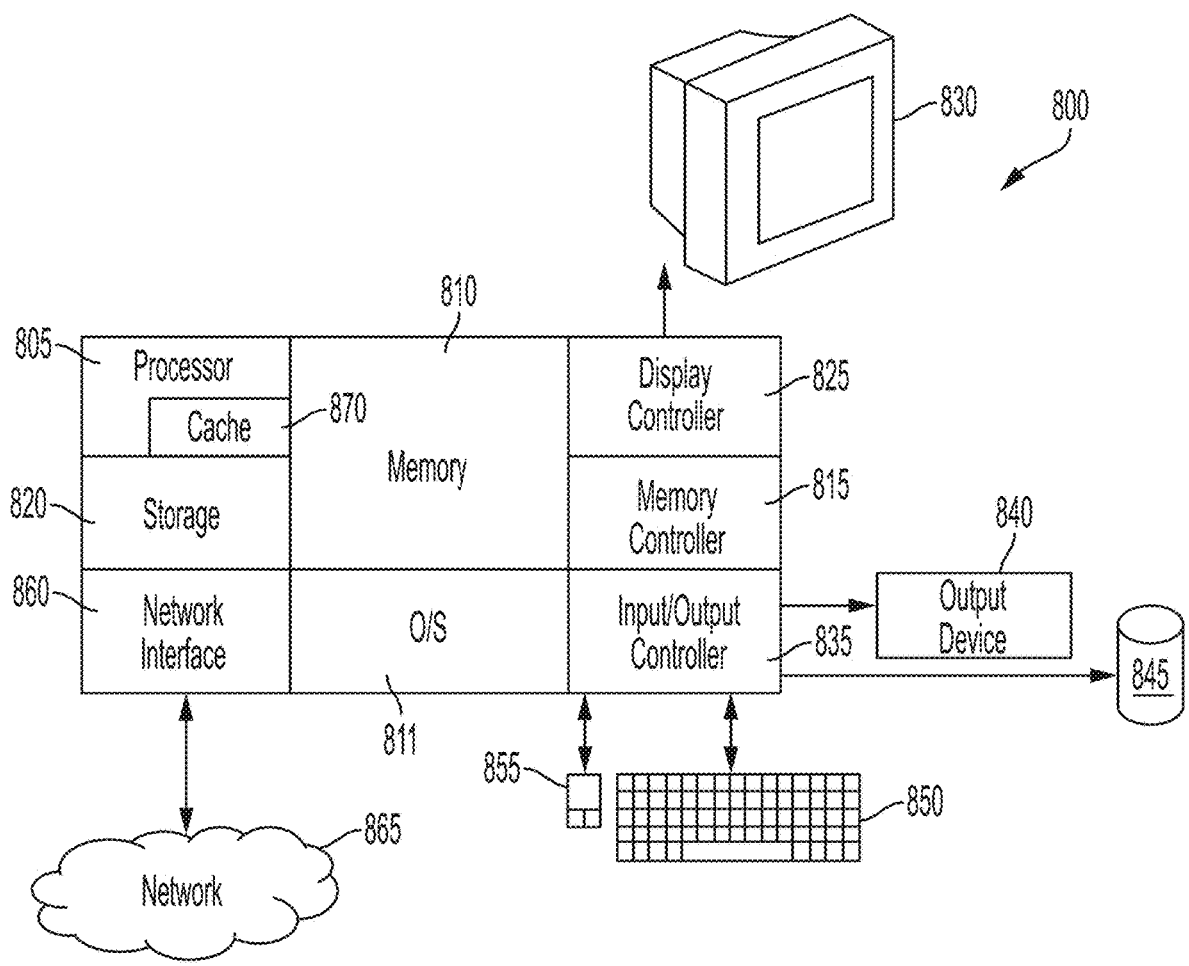
FIG. 8 is a block diagram of a computer system for implementing some or all aspects of the prediction system, according to some embodiments of the invention.

FIG. 8 is a block diagram of a computer system 800 for implementing some or all aspects of the protection system 100, according to some embodiments of this invention. The protection systems 100 and methods described herein may be implemented in hardware, software (e.g., firmware), or a combination thereof. In some embodiments, the methods described may be implemented, at least in part, in hardware and may be part of the microprocessor of a special or general-purpose computer system 800, such as a personal computer, workstation, minicomputer, or mainframe computer. For example, and not by way of limitation, each controller 110 may be a computer system 800 or portion thereof.

In some embodiments, as shown in FIG. 8, the computer system 800 includes a processor 805, memory 810 coupled to a memory controller 110, and one or more input devices 845 and/or output devices 840, such as peripherals, that are communicatively coupled via a local I/O controller 110. These devices 840 and 845 may include, for example, a printer, a scanner, a microphone, and the like. Input devices such as a conventional keyboard 850 and mouse 855 may be coupled to the I/O controller 110. The I/O controller 110 may be, for example, one or more buses or other wired or wireless connections, as are known in the art. The I/O controller 110 may have additional elements, which are omitted for simplicity, such as controllers, buffers (caches), drivers, repeaters, and receivers, to enable communications.

The I/O devices 840, 845 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 805 is a hardware device for executing hardware instructions or software, particularly those stored in memory 810. The processor 805 may be a custom made or commercially available processor, a central processing unit (CPU), an auxiliary processor among several processors associated with the computer system 800, a semiconductor-based microprocessor (in the form of a microchip or chip set), a macroprocessor, or other device for executing instructions. The processor 805 includes a cache 870, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 870 may be organized as a hierarchy of more cache levels (L1, L2, etc.).

The memory 810 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, or other types of storage media. Note that the memory 810 may have a distributed architecture, where various components are situated remote from one another but may be accessed by the processor 805.

The instructions in memory 810 may include one or more separate programs, each of which comprises an ordered listing of executable instructions for implementing logical functions. In the example of FIG. 8, the instructions in the memory 810 include a suitable operating system (OS) 811. The operating system 811 essentially may control the execution of other computer programs and provides scheduling, input-output control, file and data management, memory management, and communication control and related services.

Additional data, including, for example, instructions for the processor 805 or other retrievable information, may be stored in storage 820, which may be a storage device such as a hard disk drive or solid-state drive. The stored instructions in memory 810 or in storage 820 may include those enabling the processor to execute one or more aspects of the protection systems 100 and methods of this disclosure.

The computer system 800 may further include a display controller 110 coupled to a display 830. In some embodiments, the computer system 800 may further include a network interface 860 for coupling to a network 865. The network 865 may be an IP-based network for communication between the computer system 800 and an external server, client and the like via a broadband connection. The network 865 transmits and receives data between the computer system 800 and external systems. In some embodiments, the network 865 may be a managed IP network administered by a service provider. The network 865 may be implemented in a wireless fashion, e.g., using wireless protocols and technologies, such as WiFi, WiMax, etc. The network 865 may also be a packet-switched network such as a local area network, wide area network, metropolitan area network, the Internet, or other similar type of network environment. The network 865 may be a fixed wireless network, a wireless local area network (LAN), a wireless wide area network (WAN) a personal area network (PAN), a virtual private network (VPN), intranet or other suitable network system and may include equipment for receiving and transmitting signals.

Protection systems 100 and methods according to this disclosure may be embodied, in whole or in part, in computer program products or in computer systems 800, such as that illustrated in FIG. 8.

The description of the present invention has been presented for the purpose of illustration. This description is not intended to be exhaustive or to limit the invention to the forms disclosed. Many modifications and variations will be apparent to those of ordinary skill in the art without departing from the scope and spirit of the invention. The embodiments of the invention discussed herein were chosen and described in order to best explain the principles of the invention and the practical applications, and to enable others of ordinary skill in the art to understand the invention. While certain embodiments of the invention have been described, it will be understood that those skilled in the art, both now and in the future, may make various improvements and enhancements that fall within the scope of the claims that follow.

What is claimed is:

1. A computer-implemented method comprising:
   measuring, by a first local controller connected to a first converter, one or more characteristics of the first converter;
   the first converter belonging to a set of two or more converters in a power system configured to power equipment, and each of the two or more converters being connected to a respective local controller;
   detecting an arc fault, based at least in part on the one or more characteristics of the first converter;
   communicating, to a central controller, an indication of the arc fault; and remediating the arc fault by performing one or more remedial operations determined by at least one of the first local controller and the central controller,
wherein remediating the arc fault comprises requesting, by the first local controller, that the central controller implement disconnecting the converter from a common bus.

2. The computer-implemented method of claim 1, wherein remediating the arc fault comprises automatically drawing current from a local bus into an energy storage unit.

3. The computer-implemented method of claim 1, wherein remediating the arc fault comprises automatically disconnecting the first converter from a local bus.

4. The computer-implemented method of claim 3, wherein remediating the arc fault further comprises activating a foldback mode of the first converter, and wherein the foldback mode reduces power available to an arc of the arc fault.

5. The computer-implemented method of claim 1, further comprising:
determining a type of the arc fault, based at least in part on the one or more characteristics of the first converter; and
determining the one or more remedial operations to perform based at least in part on the type of the arc fault.

6. The computer-implemented method of claim 1, wherein remediating the arc fault comprises coordinating with a second local controller connected to at least one of a second converter, an energy storage unit, and a generator.

7. A system comprising:
two or more local controllers connected to a power system configured to power equipment, the power system comprising one or more generators and one or more converters;
wherein each local controller of the two or more local controllers is connected to at least one of a respective converter of the power system, a respective generator of the power system, and a respective energy storage unit;
a central controller in communication with each local controller of the two or more local controllers;
wherein a first local controller of the two or more local controllers comprises:
a data collection agent configured to measure one or more characteristics of a first converter connected to the first local controller;
an analysis agent configured to identify an arc fault based at least in part on the one or more characteristics of the first converter; and
a decision-making agent configured to determine a remedial operation responsive to the arc fault,
wherein the first local controller further comprises a signaling agent configured to instruct the first converter to perform the remedial operation, and
wherein instructing the first converter to perform the remedial action comprises activating a foldback mode of the first converter, wherein the foldback mode reduces power available to an arc of the arc fault.

8. The system of claim 7, wherein the first local controller further comprises a signaling agent configured to disconnect the first converter from a bus that connects the first converter to a prime power source.

9. The system of claim 7, wherein the first local controller further comprises a communications agent configured to communicate with the central controller to report the arc fault and to receive an instruction for remediating the arc fault.

10. The system of claim 7, wherein the central controller is configured to reconcile conflicts among the two or more local controllers with respect to remediating the arc fault.

11. A computer-program product for managing an arc fault, the computer-program product comprising a non-transitory computer-readable storage medium having program instructions embodied therewith, the program instructions executable by a processor to cause the processor to perform a method comprising:
measuring, by a first local controller connected to a first converter, one or more characteristics of the first converter;
the first converter belonging to a set of two or more converters in a power system configured to power equipment, and each of the two or more converters being connected to a respective local controller;
detecting an arc fault, based at least in part on the one or more characteristics of the first converter;
communicating, to a central controller, an indication of the arc fault; and
remediating the arc fault by performing one or more remedial operations determined by at least one of the first local controller and the central controller,
wherein remediating the arc fault comprises requesting, by the first local controller, that the central controller implement disconnecting the converter from a common bus.

12. The computer-program product of claim 11, the method further comprising:
determining a type of the arc fault, based at least in part on the one or more characteristics of the first converter; and
determining the one or more remedial operations to perform based at least in part on the type of the arc fault.

13. The computer-program product of claim 11, wherein remediating the arc fault comprises coordinating with a second local controller connected to at least one of a second converter, an energy storage unit, and a generator.

14. The computer-program product of claim 11, wherein remediating the arc fault comprises automatically drawing current from a local bus into an energy storage unit.

15. The computer-program product of claim 11, wherein remediating the arc fault comprises automatically disconnecting the first converter from a local bus.

16. The computer-program product of claim 15, wherein remediating the arc fault further comprises activating a foldback mode of the first converter, and wherein the foldback mode reduces power available to an arc of the arc fault.

17. A computer-implemented method comprising:
measuring, by a first local controller connected to a first converter, one or more characteristics of the first converter;
the first converter belonging to a set of two or more converters in a power system configured to power equipment, and each of the two or more converters being connected to a respective local controller;
detecting an arc fault, based at least in part on the one or more characteristics of the first converter;
communicating, to a central controller, an indication of the arc fault;
determining a type of the arc fault, based at least in part on the one or more characteristics of the first converter;

determining one or more remedial operations to perform based at least in part on the type of the arc fault; and remediating the arc fault by performing the one or more remedial operations determined by at least one of the first local controller and the central controller.

18. A computer-program product for managing an arc fault, the computer-program product comprising a non-transitory computer-readable storage medium having program instructions embodied therewith, the program instructions executable by a processor to cause the processor to perform a method comprising:

measuring, by a first local controller connected to a first converter, one or more characteristics of the first converter;

the first converter belonging to a set of two or more converters in a power system configured to power equipment, and each of the two or more converters being connected to a respective local controller;

detecting an arc fault, based at least in part on the one or more characteristics of the first converter;

communicating, to a central controller, an indication of the arc fault;

determining a type of the arc fault, based at least in part on the one or more characteristics of the first converter;

determining one or more remedial operations to perform based at least in part on the type of the arc fault; and remediating the arc fault by performing the one or more remedial operations determined by at least one of the first local controller and the central controller.

\* \* \* \* \*